United States Patent
Arimoto

(10) Patent No.: US 10,577,849 B2
(45) Date of Patent: *Mar. 3, 2020

(54) WINDOW REGULATOR CABLE GUIDE

(71) Applicant: Hi-Lex Controls, Inc., Rochester Hills, MI (US)

(72) Inventor: Shigeki Arimoto, Bloomfield Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,190

(22) Filed: Feb. 28, 2019

(65) Prior Publication Data
US 2019/0195000 A1    Jun. 27, 2019

Related U.S. Application Data

(63) Continuation-in-part of application No. 15/848,575, filed on Dec. 20, 2017.

(51) Int. Cl.
*E05F 15/689* (2015.01)
*B60J 1/17* (2006.01)

(52) U.S. Cl.
CPC .............. *E05F 15/689* (2015.01); *B60J 1/17* (2013.01); *E05Y 2201/66* (2013.01); *E05Y 2201/662* (2013.01); *E05Y 2900/55* (2013.01)

(58) Field of Classification Search
CPC ......... E05F 15/689; E05F 11/483; B60J 1/17; E05Y 2201/662; E05Y 2201/66; E05Y 2900/55; E05D 15/165
See application file for complete search history.

(56) References Cited

U.S. PATENT DOCUMENTS

| | | | |
|---|---|---|---|
| 4,433,508 A | 2/1984 | Carletta | |
| 5,613,322 A | 3/1997 | Kobrehel | |
| 5,617,675 A | 4/1997 | Kobrehel | |
| 5,864,987 A | 2/1999 | Mariel et al. | |
| 6,546,672 B2 | 4/2003 | Tatsumi et al. | |
| 8,938,914 B2 | 1/2015 | Hulst et al. | |
| 2002/0020116 A1* | 2/2002 | Arquevaux | E05F 11/485 49/349 |

(Continued)

FOREIGN PATENT DOCUMENTS

| | | | |
|---|---|---|---|
| CA | 2 436 370 A1 | 7/2002 | |
| DE | 3805576 A1 * | 11/1988 | E05F 11/485 |

(Continued)

*Primary Examiner* — Marcus Menezes
(74) *Attorney, Agent, or Firm* — Brinks Gilson & Lione

(57) ABSTRACT

A cable guide for use with a window regulator assembly includes a body with a first rail support surface and a second rail support surface in a guide rail region, and a cable support surface and a cable retention arm in a cable region. The first rail support surface is configured to pass through an aperture in a guide rail and be placed on a first side of the guide rail and a cable retention arm configured to receive a tensioned drive cable of the window regulator. The cable guide with the first and second rail support surfaces is steadily secured to the guide rail by utilizing the pushing force from the tensioned drive cable. The aperture is located along the guide rail such that the aperture is out of the slide path of the window carrier of the window regulator assembly.

17 Claims, 9 Drawing Sheets

(56) References Cited

U.S. PATENT DOCUMENTS

| | | | |
|---|---|---|---|
| 2008/0005971 A1 | 1/2008 | Dickie et al. | |
| 2009/0265993 A1* | 10/2009 | Shah | B60J 5/0416 49/352 |
| 2013/0168488 A1* | 7/2013 | Debus | E05F 11/483 242/615.3 |
| 2017/0268273 A1 | 9/2017 | Matsushita | |
| 2019/0186188 A1* | 6/2019 | Arimoto | E05D 15/165 |

FOREIGN PATENT DOCUMENTS

| | | | |
|---|---|---|---|
| EP | 2 589 737 A1 | 5/2013 | |
| JP | H 10-203162 | 8/1998 | |
| JP | 2009-299429 A | 12/2009 | |
| JP | 2013096127 A * | 5/2013 | ............ E05F 11/486 |
| KR | 100680740 | 2/2007 | |
| WO | WO-2013065721 A1 * | 5/2013 | ............ E05F 11/486 |
| WO | WO 2014/155774 A1 | 10/2014 | |

\* cited by examiner

WINDOW REGULATOR CABLE GUIDE

CROSS-REFERENCE TO RELATED APPLICATION

This application is a continuation-in-part of U.S. patent application Ser. No. 15/848,575 filed on Dec. 20, 2017, entitled "WINDOW REGULATOR CABLE GUIDE," the entire contents of which are incorporated herein by reference.

FIELD

The present disclosure relates to a cable guide for use with a window regulator assembly in a vehicle.

BACKGROUND

The statements in this section merely provide background information related to the present disclosure and may not constitute prior art.

Passenger car motor vehicles have for many decades featured movable side door glass. A mechanism is required in order to move the glass between the upper closed position and the lower opened position. These mechanisms are generally known as window regulators. Window regulators can be manually operated, or can be driven by a powered actuator, most commonly using an electric motor. One type of window regulator uses a pulley arrangement having a metal cable wrapped around pulleys and a drum driven by an electric motor. Such devices typically use a carrier which engages the door glass. The carrier may be driven along a metal guide rail by the metal cable. Specifically, the electric motor drives the drum, thereby moving the cable about the pulley arrangement and driving the carrier to control the vertical motion of the window glass.

Due to the packaging constrains of some vehicle door panels and other design constraints the electric motor and cable drum of a window regulator assembly may be located near the bottom of the guide rail. In such assemblies, the metal cable spans the length of the guide rail unsupported. To support and guide the metal cable spanning the length of the guide rail, some window regulator assemblies include a cable guide that may be attached to the guide rail. The cable guide is primarily provided to avoid undesirable noise resulting from vibration of the unsupported cable and to adjust the location of the cable to provide clearance with other door components. Conventional cable guides are typically attached to the guide rail at approximately its center using welding or TOX (interlocking metal deformation) joining. Such cable guides also require a bracket be placed between the guide rail and the cable guide.

Despite the satisfactory performance of conventional cable guides, there is constantly a desire to reduced cost, increase ease of assembly, and reduce the weight of automotive components, while providing a desirable durability, low warranty claims, and compliance with performance requirements.

SUMMARY

The present disclosure relates to a cable guide for use with a guide rail having a first and second side with an aperture for an automotive window regulator assembly which addresses the above-referenced desirable attributes. According to an exemplary form of the present disclosure, the cable guide includes a body having a guide rail region and a cable region. The guide rail region has a first rail support surface and a second rail support surface, and the cable region has a cable support surface and a cable retention arm. The cable guide further includes a snap-fit section extending toward a first end of the body with a cantilever type, and being configured to steadily secure the cable guide when the cable guide is installed to the guide rail. The cable retention arm has a first portion and a second portion. The first portion of the cable retention arm extends from the cable support surface. The second portion of the cable retention arm is cantilevered from the first portion such that an end of the second portion extends toward the first end of the body.

According to a further aspect of the present disclosure, the first rail support surface of the guide rail region with the snap-fit section passes through the aperture in the guide rail and the first rail support surface of the guide rail region supports the first side of the guide rail. The snap-fit section includes a U-shape portion and a straight portion, which pass through and are fitted in the aperture of the guide rail. The U-shape portion is resiliently bended in a bottom area of the U-shape portion for press-fitting in the aperture with the straight portion. A space between the U-shape portion and the straight portion is formed for allowing the U-shape portion to resiliently move to the space when the cable guide is installed to the guide rail. The U-shape portion of the snap-fit section includes a tab end for engaging with the second side of the guide rail when the cable guide is installed to the guide rail.

According to an exemplary form of the present disclosure, the first rail support surface of the guide rail region passes through the aperture in the guide rail, and the first rail support surface of the guide rail region supports the first side of the guide rail. The snap-fit section includes an inverted U-shape portion for engaging with an edge of the guide rail. The inverted U-shape portion is resiliently bended in a top area of the inverted U-shape portion for press-fitting on the edge of the guide rail. In addition, the inverted U-shape portion includes a tab end for engaging with the first side of the guide rail when the cable guide is installed to the guide rail.

According to a further aspect of the present disclosure, the second rail support surface of the guide rail region is configured to place on the second side of the guide rail, and the second side of the guide rail is an opposite side from the first side of the guide rail. Each of the first and second rail support surfaces is configured to press against the respective first and second side of the guide rail.

According to a further aspect of the present disclosure, the second portion of the cable retention arm and the cable support surface define a cable gap, and the cable retention arm is configured to receive a window regulator cable in the cable gap. The first rail support surface and the cable support surface are facing to the same direction.

According to a further aspect of the present disclosure, the snap-fit section is integrally formed with the body of the cable guide. In addition, the cable retention arm is integrally formed with the body of the cable guide. The cable guide is formed of a plastic material using an injection molding process and configured to interlock with the guide rail.

Further aspects of the invention are explained in greater detail below by means of preferred illustrative embodiment with reference to the attached drawings. The drawings are provided for purely illustrative purposes and are not intended to limit the scope of the present invention.

DRAWINGS

Further details of the invention are described in more detail with reference to the drawings, in which.

Figure 12:
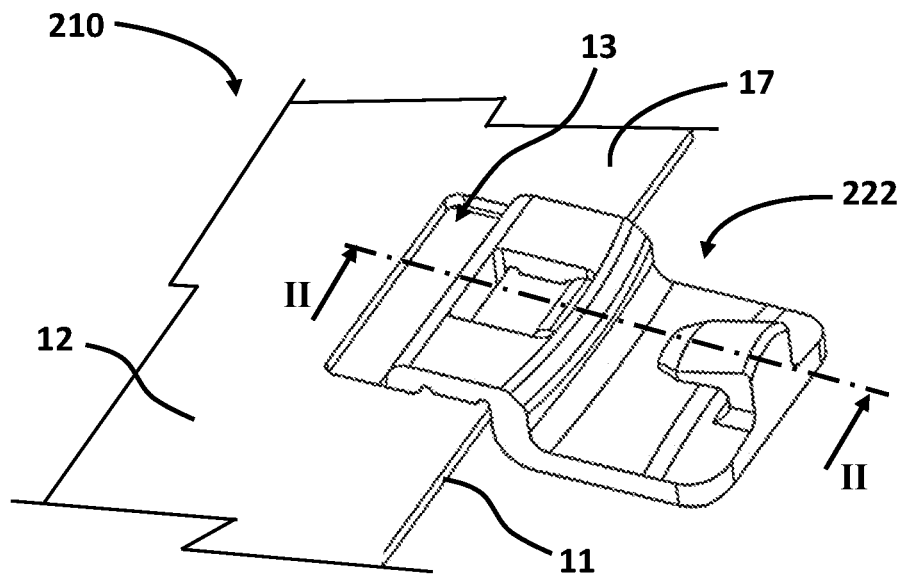
Figure 13:
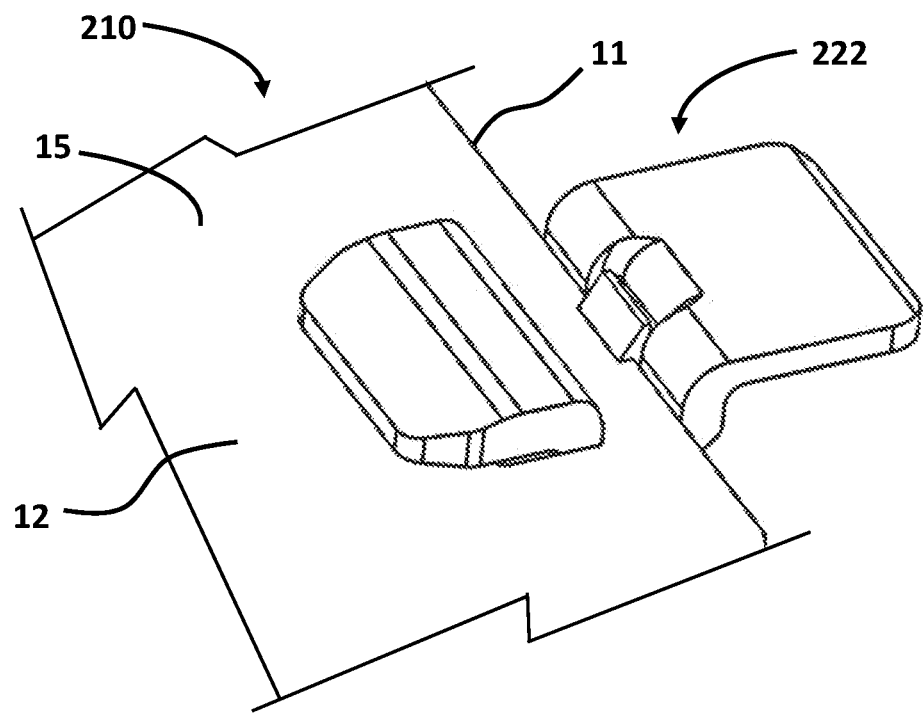
Figure 14:
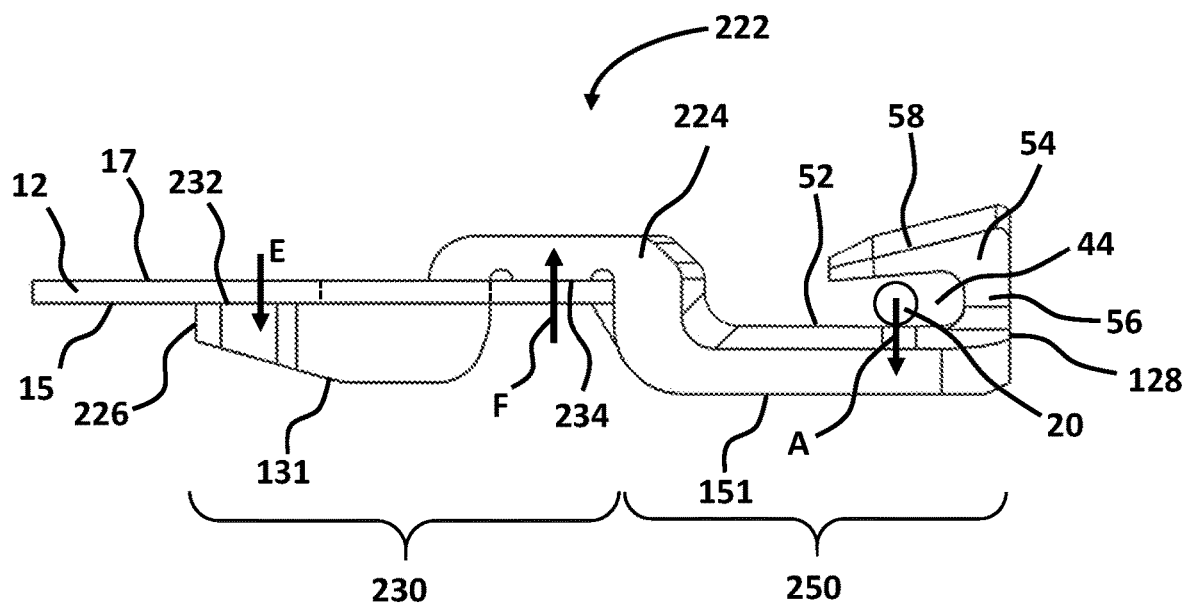

FIG. 12 a perspective view of a cable guide installed to the guide rail in accordance with an exemplary form of the present disclosure;

FIG. 13 is a bottom view of the cable guide of FIG. 12;

FIG. 14 is a side view of the cable guide of FIG. 12; and

Figure 15:
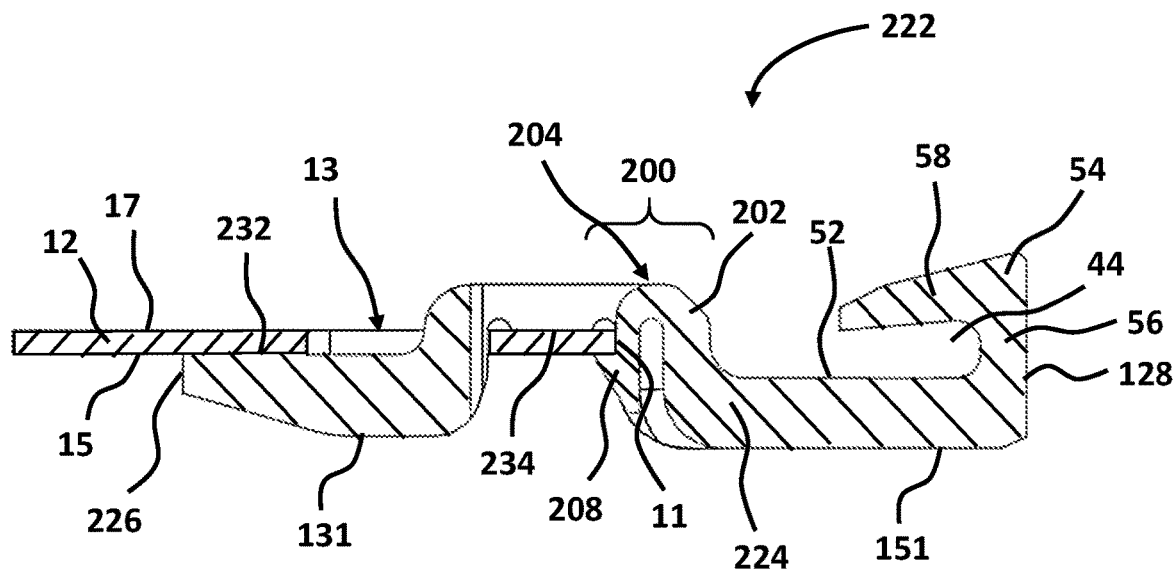

FIG. 15 shows a cross-section view of the cable guide of FIG. 12, taken along line II-II of FIG. 12.

The drawing described herein are for illustration purposes only and are not intended to limit the scope of the present disclosure in any way.

DETAILED DESCRIPTION

The following description is merely exemplary in nature and is not intended to limit the present disclosure, application, or use. It should be understood that throughout the drawings, corresponding reference numerals indicate like or corresponding parts and features.

Figure 1:
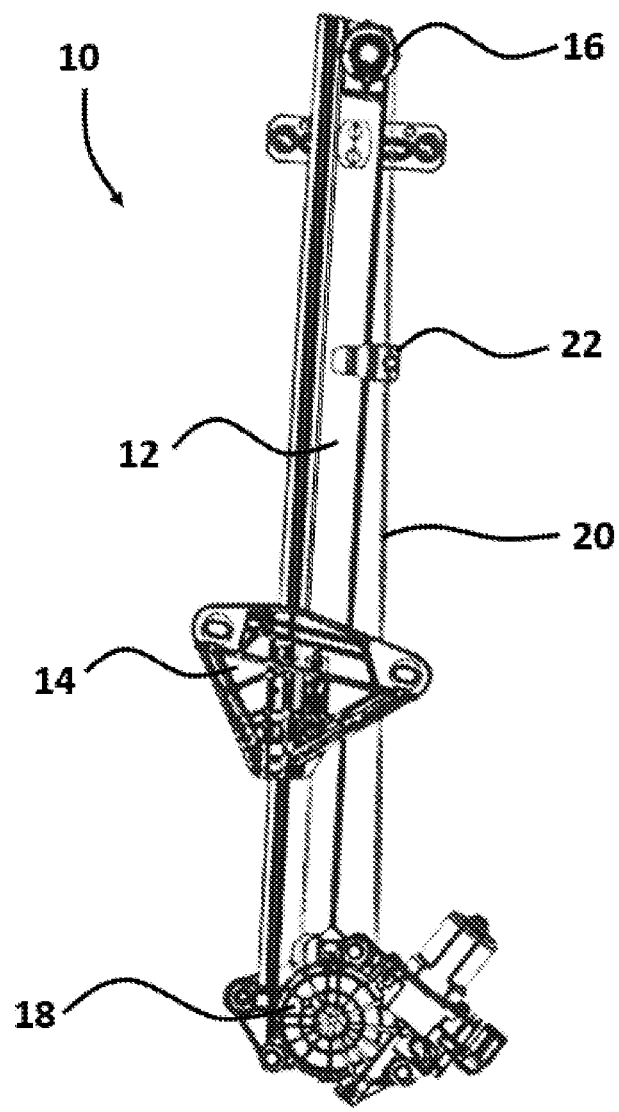
FIG. 1 is a perspective view of a window regulator assembly incorporating a cable guide in accordance with an exemplary form of the present disclosure.

With reference to FIG. 1, a window regulator assembly 10 is illustrated, which includes as principal components, a guide rail 12, a window carrier 14, a cable deflector 16 such as a cable slider or a pulley, a motor drive assembly 18, a drive cable 20, and a cable guide 22. The guide rail 12 may be formed of sheet-metal using a forming or rolling process or as an extrusion. The window carrier 14 is caused to travel up and down along the guide rail 12 and includes a window clamp arrangement (not shown) which attaches to the lower edge of the vehicle side door glass (not shown).

The cable deflector 16 is positioned at the top of the guide rail 12 and acts to redirect and tension the drive cable 20. The motor drive assembly 18 positioned at the bottom of the guide rail 12 is actuated and powered electrically to move the drive cable 20. The drive cable 20 wraps around the cable deflector 16 and wraps around a pulley within the motor drive assembly 18 where it is driven. Ends of the drive cable 20 may terminate at attachment points on the window carrier 14. The drive cable 20 spans the entire length of the guide rail 12. A cable guide 22 in accordance with the present invention is attached to the guide rail 12 to support the drive cable 20 to reduce noise and rattle caused by vibration of the drive cable 20. The motor drive assembly 18 is affixed to the bottom of the guide rail 12 but could be positioned at other locations depending on application requirements. Similarly, the cable deflector 16 is shown at the top of the guide rail 12 but may be implemented in various other positions depending on the application. The cable guide 22 is attached to the guide rail 12 at a position along the length of the guide rail 12 between the motor drive assembly 18 and the cable deflector 16. The window regulator assembly 10 is shown as a single rail type system. Alternate implementations may use a pair of separated guide rails provided for better control of the movable glass or other panel.

Figure 2:
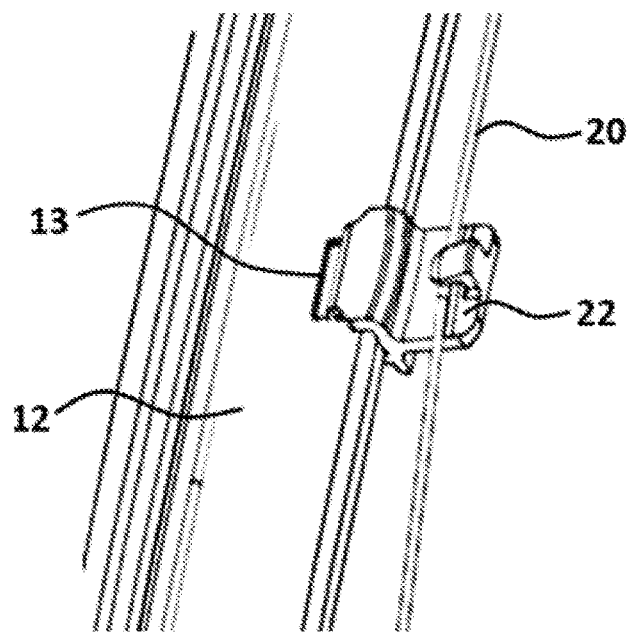
FIG. 2 shows an enlarged view of the cable guide installed to a guide rail of the window regulator assembly of FIG. 1.
Figure 3:
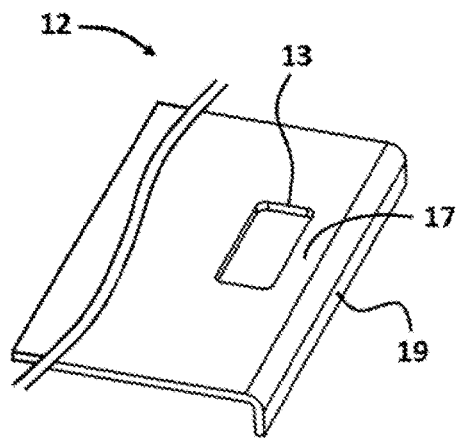
FIG. 3 shows an enlarged view of the guide rail.
Figure 5:
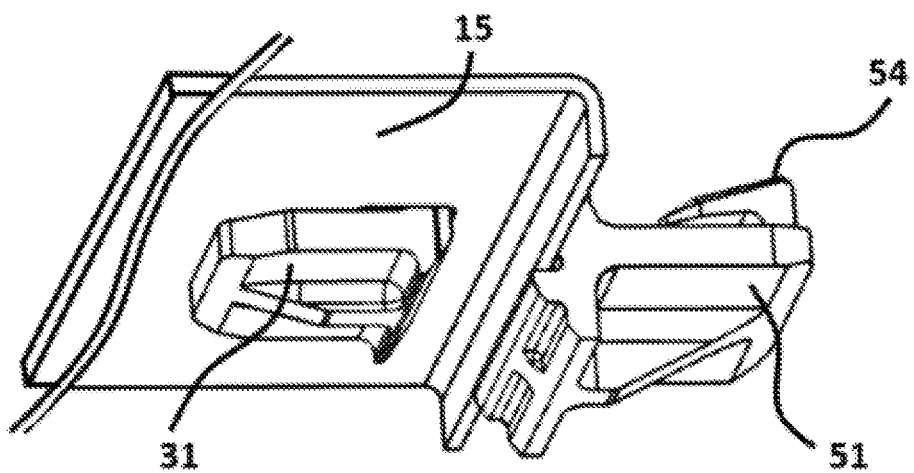
FIG. 5 is a bottom view of the cable guide installed to the guide rail of the window regulator in accordance with the present disclosure.

FIGS. 3 and 5 show a section of the guide rail 12 of the window regulator assembly 10. The guide rail 12 has a first side 15, a second side 17 and a third side 19. The first side 15 of the guide rail 12 is one side of the sheet-metal guide rail 12. The second side 17 of the guide rail 12 is opposite side from the first side 15 of the guide rail 12. As shown, the third side 19 of the guide rail 12 is perpendicularly bended from the second side 17 of the guide rail 12, however, other suitable angled shape may be implemented. An aperture 13 passes through the guide rail 12 near the third side 19 of the guide rail 12. The aperture 13 is located in an area of the guide rail 12 where the window carrier 14 does not slide on the guide rail 12 as the window carrier 14 moves the window glass between the open and closed positions. Locating the aperture 13 in such a position allows the use of a simple through hole for the aperture 13 rather than requiring a specially manufactured depression or depression and hole combination as is required by standard cable guides. Therefore, by locating the aperture 13 near the third side 19 of the guide rail 12 out of the path of the window carrier 14, the ease of guide rail 12 design and manufacturing is improved. The aperture 13 is located along the length of the guide rail 12 between the cable deflector 16 at one end of the guide rail 12 and the motor drive assembly 18 at another end of the guide rail 12. FIG. 2 shows the section of the guide rail 12 as shown in FIG. 3 with the cable guide 22 connected to the guide rail 12. The cable guide 22 attaches to the guide rail 12 at the aperture 13. When attached to the guide rail 12, the cable guide 22 retains and supports the drive cable 20 of the window regulator assembly 10.

Figure 4:
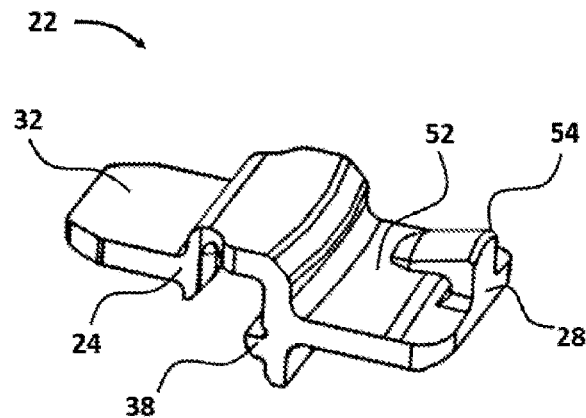
FIG. 4 is a perspective view of the cable guide of the present disclosure.
Figure 6:
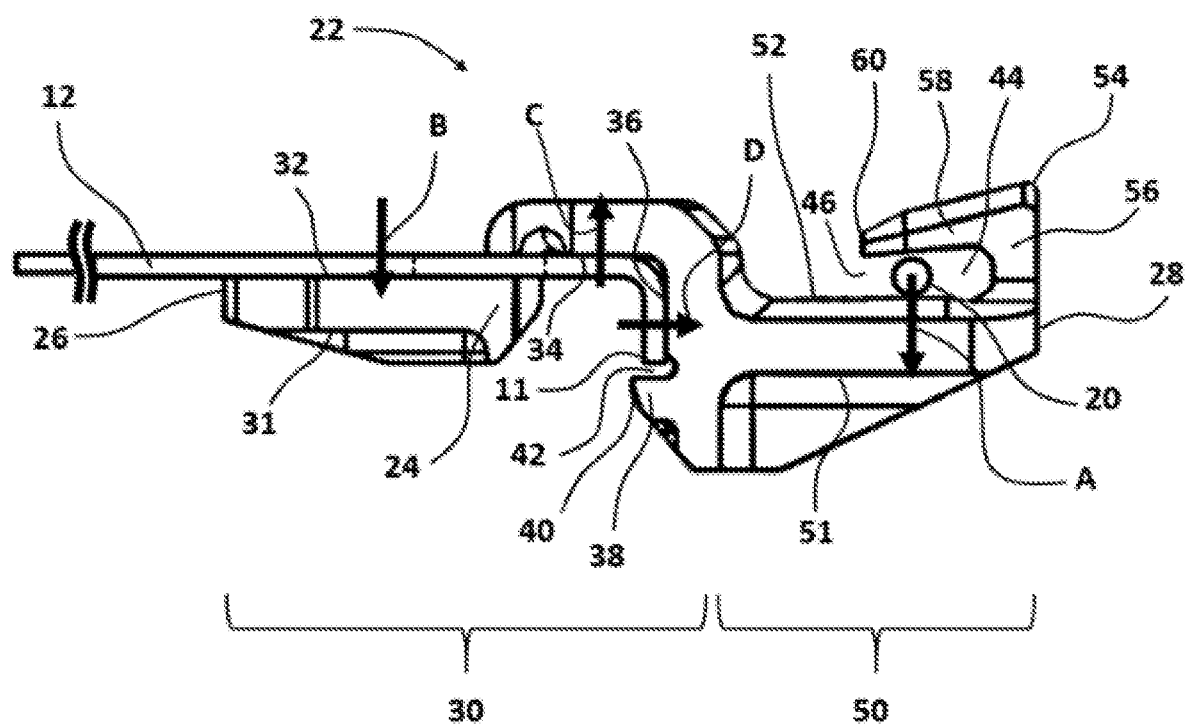
FIG. 6 shows a side view of the cable guide installed to the guide rail of the window regulator in accordance with the present disclosure.

Referring to FIGS. 4, 5 and 6, the cable guide 22 includes a body 24 that has a guide rail region 30 near a first end 26 of the body 24 and a cable region 50 near a second end 28 of the body 24. The guide rail region 30 has the first rail support surface 32, a second rail support surface 34 and a third rail support surface 36. The cable region 50 has a cable support surface 52 and a cable retention arm 54. The first rail support surface 32 and the cable support surface 52 are facing to the same direction. The first rail support surface 32 and the cable support surface 52 are positioned along what may be considered the top of the body 24, however, the terms top, bottom, side, etc. are simply used in this description to facilitate ease of understanding and are in no way intended to limit the scope of the disclosure. The cable guide 22 also includes a first bottom surface 31 in the guide rail region 30 and a second bottom surface 51 in the cable region 50. Each of the first and second bottom surface 31, 51 of the cable guide 22 may have various shapes to correspond to facilitating the installation of the cable guide 22 to the guide rail 12.

Figure 7:
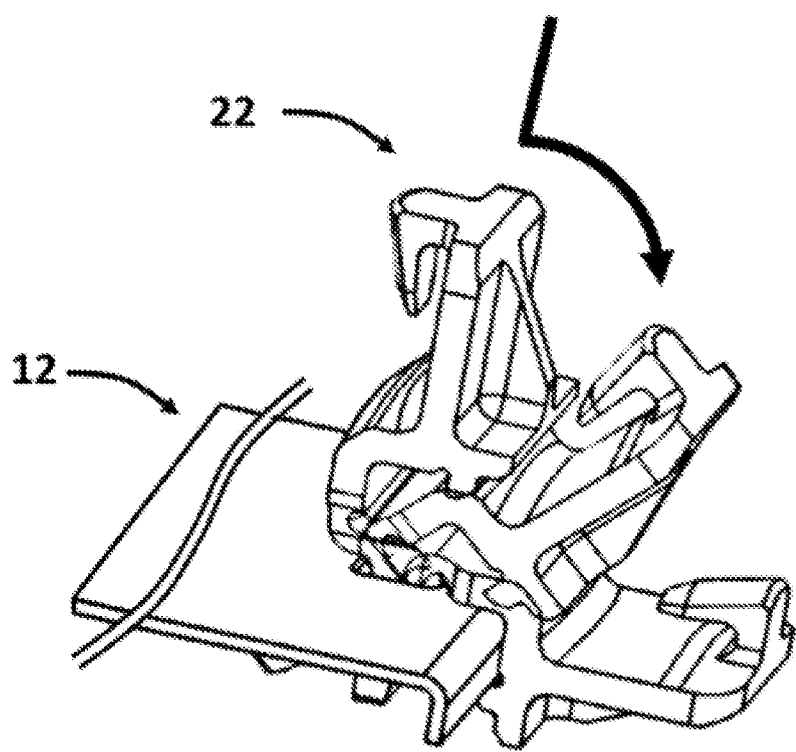
FIG. 7 is a perspective view of the cable guide installing to the guide rail.

The region of the first rail support surface 32 of the body 24 is started from the first end 26 of the cable guide 22. As shown in FIGS. 6 and 7, all of the first rail support surface 32 is configured to be placed through the aperture 13 of the guide rail 12 and support the first side 15 of the guide rail 12. Accordingly, the first rail support surface 32 of the cable guide 22 is in contact with the first side 15 of the guide rail 12.

The region of the second rail support surface 34 of the body 24 is continued to the direction of the second end 28 of the body 24 from the region of the first rail support surface 32. The area where the region of the first rail support surface 32 transitions to the region of the second rail support surface 34 of the body 24 may be curved, stepped, angled or another geometry to correspond to facilitating the installation of the cable guide 22 to the guide rail 12. The second rail support surface 34 of the cable guide 22 is configured to be placed on the second side 17 of the guide rail 12. The facing direction of the second rail support surface 34 is opposite side from the facing direction of the first rail support surface 32. Accordingly, the second rail support surface 34 of the cable guide 22 is in contact with the second side 17 of the guide rail 12.

As shown in FIGS. 3 and 6, the region of the third rail support surface 36 of the body 24 is perpendicularly bended from the region of the second rail support surface 34, however, other suitable angled shape may be implemented for corresponding to the geometry of the guide rail 12. The third rail support surface 36 is configured to be placed on the third side 19 of the guide rail 12 and support the guide rail 12. Accordingly, the third rail support surface 36 of the cable guide 22 is in contact with the third side 19 of the guide rail 12.

The cable guide 22 further includes a snap tab 38. As shown in FIG. 6, the snap tab 38 is extended from the third rail support surface 36 to the direction of the first end 26 of the body 24. The snap tab 38 is perpendicular to the third rail support surface 36, however, other suitable angled shape may be implemented. An end 40 of the snap tab 38 is beyond the thickness of the guide rail 12. The snap tab 38 is configured to prevent separating the cable guide 22 from the guide rail 12 after the cable guide 22 is attached to the guide rail 12. The snap tab 38 is integrally formed with the body 24. The end 40 of the snap tab 38 may be curved, blunt, or another geometry to correspond to the geometry of the cable guide 22. As shown, the snap tab 38 and an edge 11 of the guide rail 12 define a gap 42 and the thickness of the gap 42 is equal to or greater than zero.

The cable guide 22 further includes a cable retention arm 54. The cable retention arm 54 is L-shaped and has a first portion 56 and a second portion 58. The cable retention arm 54 is integrally formed with the body 24. The first portion 56 and the second portion 58 are integrally formed. The area where the first portion 56 and the second portion 58 come together or where the first portion 56 transitions to the second portion 58 may be curved, tapered, or angled. The first portion 56 of the cable retention arm 54 extends from the cable support surface 52. The first portion 56 is perpendicular to the cable support surface 52. The second portion 58 of the cable retention arm 54 is cantilevered from the first portion 56 such that an end 60 of the second portion 58 extends toward the first end 26 of the body 24.

The second portion 58 of the cable retention arm 54 and the cable support surface 52 define a cable gap 44. The cable retention arm 54 is configured to receive a drive cable 20 of a window regulator 10 in the cable gap 44. The thickness of the cable gap 44 is equal to or greater than the thickness or diameter of the drive cable 20 such that the drive cable 20 fits in the cable gap 44. Since an opening side 46 of the cable gap 44 is the first end 26 direction of the body 24, the structure configuration of the cable retention arm 54 keeps the drive cable 20 retained within the cable gap 44. In an embodiment, the end 60 of the second portion 58 of the cable retention arm 54 may be thickened to retain the drive cable 20 in the cable gap 44.

Referring to FIG. 7, the cable guide 22 is attached to the guide rail 12 of the window regulator assembly 10 by first inserting all of the first rail support surface 32 into the aperture 13 of the guide rail 12. After that, by rotating the cable guide 22 about the guide rail 12, the first rail support surface 32 is placed on the first side 15 of the guide rail 12. Continuing to rotate the cable guide 22 about the guide rail 12 causes each of the respective second and third rail support surface 34, 36 of the cable guide 22 to be placed on each of the respective second and third side 17, 19 of the guide rail 12. The snap tab 38 is positioned close to the edge 11 of the guide rail 12. Accordingly, each of the respective first, second and third rail support surface 32, 34, 36 of the cable guide 22 is in contact with each of the respective first, second and third side 15, 17, 19 of the guide rail 12.

As shown in FIG. 6, the drive cable 20 is inserted into the cable gap 44 between the cable retention arm 54 and the cable support surface 52. The drive cable 20 is configured to press against the cable support surface 52. The tensioned drive cable 20 exerts a force A on the cable support surface 52. In turns, the first side 15 of the guide rail exerts a force B on the first rail support surface 32, and the second side 17 of the guide rail 12 exerts a force C on the second rail support surface 34. The third side 19 of the guide rail 12 also exerts a force D on the third rail support surface 36. Accordingly, each of the respective first, second and third rail support surface 32, 34, 36 of the cable guide 22 is configured to press against each of the respective first, second and third side 15, 17, 19 of the guide rail 12. These forces are balanced to steadily secure the cable guide 22 to the guide rail 12 of the window regulator assembly 10.

In accordance with another form of the present disclosure, FIGS. 8 through 11 illustrates a window regulator assembly 110 with a cable guide 122. The cable guide 122 includes a body 124 that has a guide rail region 130 and a cable region 150. Since the cable region 150 of the body 124 is similar to the cable region 50 of the cable guide 22 in FIG. 6, the detail illustration of the cable region 150 is omitted.

Figure 8:
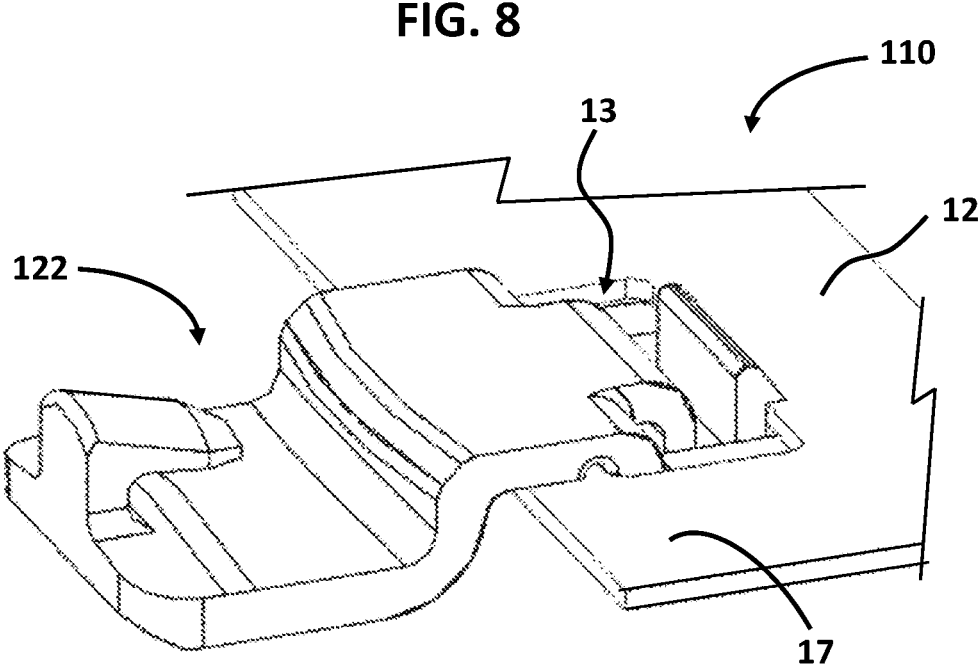
FIG. 8 is a perspective view of a cable guide installed to the guide rail in accordance with an exemplary form of the present disclosure.
Figure 9:
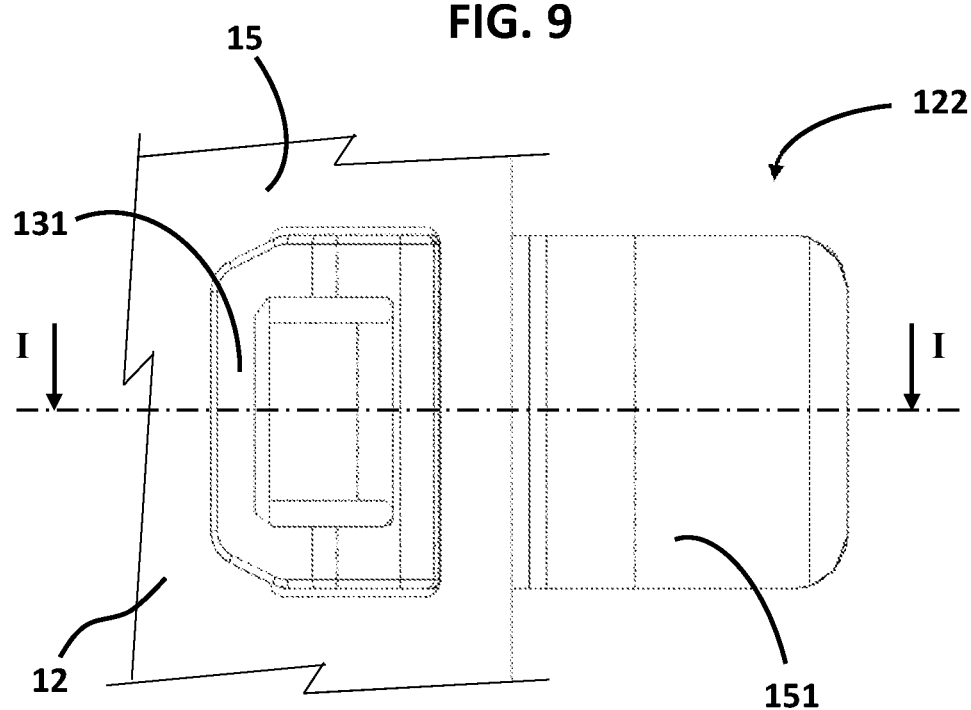
FIG. 9 is a bottom view of the cable guide of FIG. 8.
Figure 10:
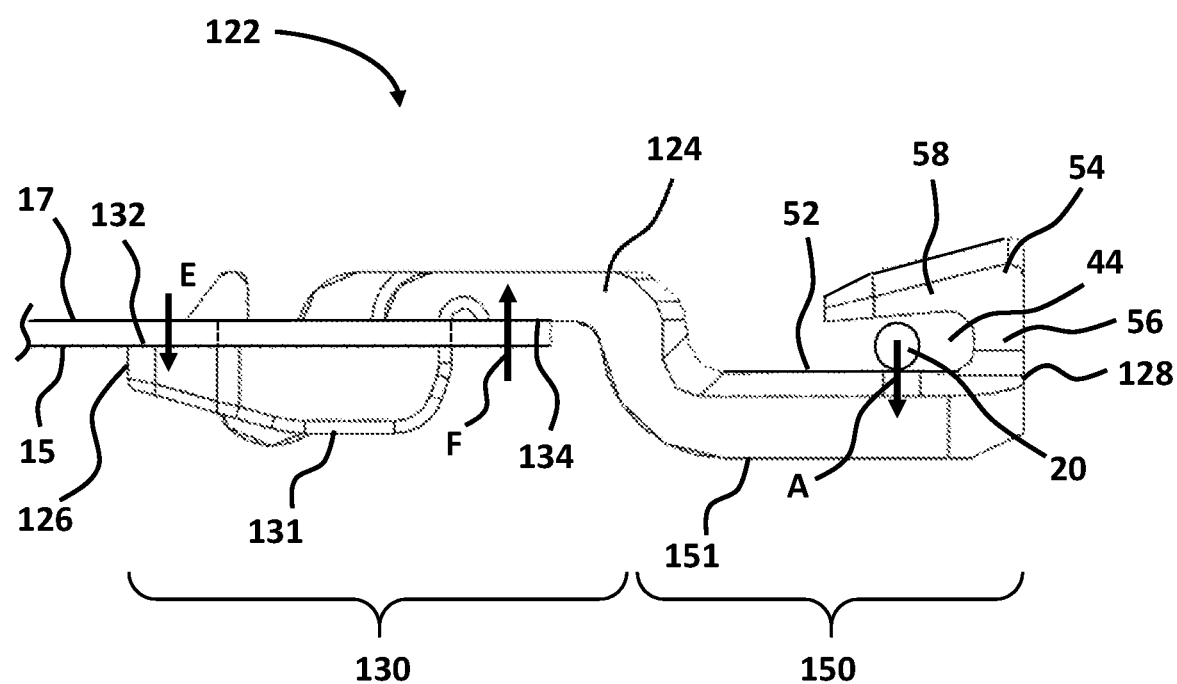
FIG. 10 is a side view of the cable guide of FIG. 8.

In FIGS. 8, 9 and 10, the guide rail region 130 of the cable guide 122 includes a first rail support surface 132 and a second rail support surface 134. The first rail support surface 132 is facing to the same direction as the cable support surface 52 of the cable region 150. The first rail support surface 132 and the cable support surface 52 are positioned along what may be considered the top of the body 124. In addition, the cable guide 122 includes a first bottom surface 131 in the guide rail region 130 and a second bottom surface 151 in the cable region 150.

In FIGS. 8, 9 and 10, the guide rail region 130 of the body 124 is started from a first end 126 of the body 124. The first rail support surface 132 is configured to place through the aperture 13 of the guide rail 12, and supports the first side 15 of the guide rail 12. Accordingly, the first rail support surface 132 of the cable guide 122 is in contact with the first side 15 of the guide rail 12. The region of the second rail support surface 134 of the body 124 is continued to the direction of the second end 128 of the body 124 from the region of the first rail support surface 132. The area where the region of the first rail support surface 132 transitions to the region of the second rail support surface 134 of the body 124 may be curved, stepped, angled or another geometry to correspond to facilitating the installation of the cable guide 122 to the guide rail 12.

As shown in FIG. 10, the second rail support surface 134 of the cable guide 122 is configured to place on the second side 17 of the guide rail 12. The facing direction of the second rail support surface 134 is an opposite side from the facing direction of the first rail support surface 132. The second rail support surface 134 of the cable guide 122 is contact with the second side 17 of the guide rail 12.

Figure 11:
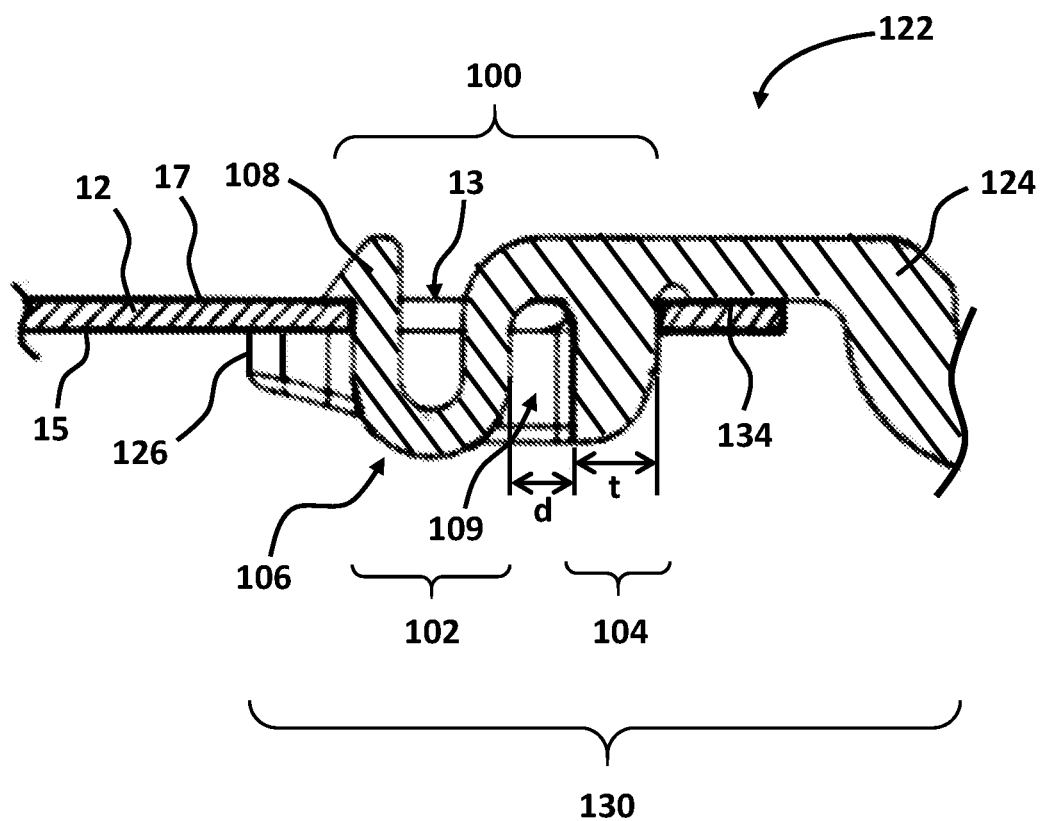
FIG. 11 shows a cross-section view of a guide rail region of the cable guide of FIG. 9, taken along line I-I of FIG. 9.

FIG. 11 illustrates a snap-fit section 100 extending toward the first end 126 of the body 124 from the region of the second rail support surface 134. The snap-fit section 100 is press-fitted in the aperture 13 of the guide rail 12. However, other shapes of the snap-fit section 100 may be implemented according to other forms of the present disclosure. As shown in FIG. 11, the snap-fit section 100 further includes a U-shape portion 102 and a straight portion 104. The U-shape portion 102 is resiliently bended in a bottom area 106 of the U-shape portion 102. Accordingly, the snap-fit section 100 is press-fitted in the aperture 13 due to the resilient U-shape portion 102 with the straight portion 104.

In addition, the U-shape portion 102 includes a tab end 108 placed on and engaged with the second side 17 of the guide rail 12. The tab end 108 is integrally formed with the snap-fit section 100 of the body 124 and configured to hold the cable guide 122 when the cable guide 122 is installed to the guide rail 12. As shown in FIG. 11, the snap-fit section 100 is further includes the straight portion 104, and the straight portion 104 with the U-shape portion 102 is configured to fit in the aperture 13 of the guide rail 12. A thickness t of the straight portion 104 is generally varied according to the size of the aperture 13 and a space 109 with a distance d between the U-shape portion 102 and the straight portion 104 for fitting in the aperture 13 of the guide rail 12. The space 109 allows the U-shape portion 102 to resiliently move in the space 109 when the snap-fit section 100 passes through the aperture 13 and is fitted in the aperture 13 of the guide rail 12. As shown in FIG. 11, therefore, the U-shape portion 102 and the straight portion 104 pass through the aperture 13 when the cable guide 122 is installed to the guide rail 12.

In FIG. 11, the snap-fit section 100 extends from the region of the second rail support surface 134 as a cantilever type, and is press-fitted in the aperture 13 of the guide rail 12. As described above, the U-shape portion 102 and the straight portion 104 pass through the aperture 13 and are press-fitted in the aperture 13. Due to the U-shape portion 102 and the straight portion 104, the snap-fit section 100 is configured to support the force exerted by the drive cable 20. Accordingly, the snap-fit section 100 can steadily secure the cable guide 122 to the guide rail 12 by supporting the force when the window carrier 14 is operated. However, in accordance with other forms of the present disclosure, other shapes of the snap-fit section 100 may be implemented for supporting the forces.

Referring back to FIG. 10, after the cable guide 122 is installed to the guide rail 12, the drive cable 20 is placed in the cable gap 44 between the cable retention arm 54 and the cable support surface 52. The drive cable 20 is configured to press against the cable support surface 52. The tensioned drive cable 20 exerts the force A shown as in FIG. 10. In turn, the first side 15 of the guide rail 12 exerts a force E on the first rail support surface 132, and the second side 17 of the guide rail 12 exerts a force F on the second rail support surface 134. Accordingly, each of the first and second rail support surfaces 132 and 134 of the cable guide 122 is configured to press against the respective first and second side 15 and 17 of the guide rail 12. These forces are balanced to steadily secure the cable guide 122 to guide rail 12 with the snap-fit section 100. Therefore, the cable guide 122 interlocks with the guide rail 12 when it is assembled in the window regulator assembly 110.

In accordance with another form of the present disclosure, FIGS. 12 through 15 illustrates a window regulator assembly 210 with a cable guide 222 includes a body 224 that has a guide rail region 230 and a cable region 250. Since the cable region 250 of the body 224 is similar to the cable region 50 and 150 of the cable guide 22 and 122 in FIGS. 6 and 10, the detail illustration of the cable region 250 is omitted. Furthermore, since the guide rail region 230 of the body 225 is similar to the guide rail region 130 of the cable guide 122 in FIG. 10 except a snap-fit section 200 in the guide rail region 230, the detail illustration of the guide rail region 230 is omitted. In FIGS. 12-15, the snap-fit section 200 is formed at different area in the body 224 of the cable guide 222, compared to the snap-fit section 100 in one of the examples as shown in FIGS. 8-11. The snap-fit section 200 in FIGS. 12-15 are configured for engaging with the edge 11 of the guide rail 12 and the first side 15 of the guide rail 12.

In FIGS. 14 and 15, the snap-fit section 200 extends toward a first end 226 from the cable region 250 in the body 224. The snap-fit section 200 includes an inverted U-shape portion 202, which is resiliently bended in a top area 204 of the inverted U-shape portion 202. Accordingly, the snap-fit section 200 is engaged with the guide rail 12 when the cable guide 222 is installed to the guide rail 12 due to the resilient inverted U-shape portion 202. The inverted U-shape portion 202 further includes a tab end 208 placed on and engaged with the first side 15 and the edge 11 of the guide rail 12. The tab end 208 is integrally formed with the snap-fit section 200 of the body 224 and configured to hold the cable guide 222 when the cable guide 222 is installed to the guide rail 12.

Compared to the cable guide 122 in FIG. 10, only the first rail support surface 232 of the cable guide 222 in FIG. 15 passes through the aperture 13 of the guide rail 12 for supporting to the first side 15 of the guide rail 12. As shown in FIG. 15, the snap-fit section 200 may not pass through the aperture 13 of the guide rail 12. As shown in FIG. 15, the snap-fit section 200 is configured to engage with the edge 11 of the guide rail 12 and the tab end 208 of the inverted U-shape portion 202 supports the first side 15 of the guide rail 12. As described above, the snap-fit section 200 is formed as a cantilever type and configured to support the force exerted by the drive cable 20. As shown in FIG. 14, each of the first and second rail support surfaces 232 and 234 of the cable guide 222 is configured to press against the respective first and second side 15 and 17 of the guide rail 12. The forces A, E and F are balanced to steadily secure the cable guide 222 to guide rail 12 with the snap-fit section 200 when the window carrier 14 is operated. Therefore, the cable guide 222 interlocks with the guide rail 12 when it is assembled in the window regulator assembly 210.

Advantageously, the cable guides 22, 122 and 222 are configured to reduce the overall weight and the packaging size of the window regulator assemblies 10, 110 and 210. In addition, the forces exerted by the tensioned drive cable 20 reduce looseness which can cause rattle and noise.

The cable guides 22, 122 and 222 may be formed of a plastic material using an injection molding process or any other suitable manufacturing process.

While the above description constitutes the preferred embodiments of the present invention, it will be appreciated that the invention is susceptible to modification, variation and change without departing from the proper scope and fair meaning of the accompanying claims.

What is claimed is:

1. A cable guide for use with a guide rail having a first and second side with an aperture, the cable guide comprising:

a body having a guide rail region and a cable region, the guide rail region having a first rail support surface and a second rail support surface and the cable region having a cable support surface and a cable retention arm, the first rail support surface disposed in an exterior surface of the body in the guide rail region, and configured to be placed through the aperture of the guide rail and contacting the first side of the guide rail;

a snap-fit section extending toward a first end of the body, the snap-fit section being configured to steadily secure the cable guide when the cable guide is installed to the guide rail; and the cable retention arm having a first portion extending from the cable support surface and a second portion cantilevered from the first portion such that an end of the second portion extends toward the first end of the body.

2. The cable guide of claim 1, wherein the first rail support surface of the guide rail region with the snap-fit section passes through the aperture in the guide rail, and the first rail support surface of the guide rail region supports the first side of the guide rail.

3. The cable guide of claim 2, wherein the snap-fit section includes a U-shape portion and a straight portion, which pass through and are fitted in the aperture of the guide rail.

4. The cable guide of claim 3, wherein the U-shape portion is resiliently bended in a bottom area of the U-shape portion for press-fitting in the aperture with the straight portion.

5. The cable guide of claim 3, wherein a space between the U-shape portion and the straight portion is formed for allowing the U-shape portion to resiliently move to the space when the cable guide is installed to the guide rail.

6. The cable guide of claim 3, wherein the U-shape portion of the snap-fit section includes a tab end for engaging with the second side of the guide rail when the cable guide is installed to the guide rail.

7. The cable guide of claim 1, wherein the snap-fit section includes an inverted U-shape portion for engaging with an edge of the guide rail.

8. The cable guide of claim 7, wherein the inverted U-shape portion is resiliently bended in a top area of the inverted U-shape portion for press-fitting on the edge of the guide rail.

9. The cable guide of claim 7, wherein the inverted U-shape portion includes a tab end for engaging with the first side of the guide rail when the cable guide is installed to the guide rail.

10. The cable guide of claim 1, wherein the second rail support surface of the guide rail region is configured to be placed on the second side of the guide rail, and the second side of the guide rail is an opposite side from the first side of the guide rail.

11. The cable guide of claim 10, wherein each of the first and second rail support surfaces is configured to press against the respective first and second side of the guide rail.

12. The cable guide of claim 1, wherein the second portion of the cable retention arm and the cable support surface define a cable gap, and the cable retention arm is configured to receive a window regulator cable in the cable gap.

13. The cable guide of claim 1, wherein the first rail support surface and the cable support surface are facing to a same direction.

14. The cable guide of claim 1, wherein the snap-fit section is integrally formed with the body of the cable guide.

15. The cable guide of claim 1, wherein the cable retention arm is integrally formed with the body of the cable guide.

16. The cable guide of claim 1, wherein the cable guide is formed of a plastic material using an injection molding process.

17. The cable guide of claim 1, wherein the cable guide is configured to interlock with the guide rail.

* * * * *